UNITED STATES PATENT OFFICE.

ERNEST A. WILDMAN, OF NEW YORK, N. Y., AND LAMBERT THORP, OF DETROIT, MICHIGAN, ASSIGNORS TO PARKE, DAVIS & COMPANY, OF DETROIT, MICHIGAN, A CORPORATION OF MICHIGAN.

ANESTHETIC BODIES.

1,193,651.   Specification of Letters Patent.   Patented Aug. 8, 1916.

No Drawing.   Application filed April 17, 1916.   Serial No. 91,827.

*To all whom it may concern:*

Be it known that we, ERNEST A. WILDMAN and LAMBERT THORP, both citizens of the United States of America, residing at New York, in the county and State of New York, and Detroit, in the county of Wayne and State of Michigan, respectively, have invented certain new and useful Improvements in Anesthetic Bodies, of which the following is a specification.

The invention relates to the manufacture of synthetic bodies having anesthetic properties resembling cocain.

It is the object of the invention to obtain a body or series of bodies, which, while possessing strong anesthetic properties, are of a less toxic nature than the cocain.

We have found that the alkamin esters of para-toluic acid may be obtained by acting upon alkamins with para-toluyl chlorid. The compounds, thus obtained, hitherto unknown, are valuable for medicinal purposes as local anesthetics, and may be represented by the formula:

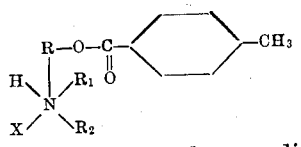

in which R is any bivalent radical of the type:

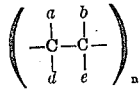

where C is the carbon atom, $a$, $b$, $d$ and $e$ are atoms or radicals such as hydrogen, alkyl, aryl or alkaryl. $n$ stands for the number of carbon atoms in the chain. $R_1$ and $R_2$ are hydrogen atoms or alkyl or alkaryl radicals which may be alike or different. X is a halogen atom.

The alkamin esters of para-toluic acid are colorless compounds, oils or low-melting solids, readily soluble in alcohol, ether or benzene, very slightly soluble in water and of alkaline reaction toward litmus. The said esters form salts readily soluble in water. Upon heating with acids or alkalis the alkamin esters of para-toluic acid are decomposed with formation of para-toluic acid and an alkamin. To prepare the said new esters of alkamins, the process may be carried out, for instance, as follows: Thirteen parts, by weight, of an alkamin, such as the gamma-diethylamino propyl alcohol, are dissolved in eighty parts, by weight, of benzene, and to this solution are added gradually fifteen parts, by weight, of para-toluyl chlorid. Soon, more especially upon cooling, the solution begins to deposit the hydrochlorid of the gamma-diethylamino propyl ester of para-toluic acid in the form of white crystals. This hydrochlorid is readily soluble in water and separates from its solution in a mixture of acetone and ether in the form of snow-white crystals which have a melting-point of 140° centigrade. From an equeous solution of the hydrochlorid a solution of potassium carbonate precipitates as an oil the free alkamin ester, namely, the gamma-diethylamino propyl ester of para-toluic acid. In an analogous or different manner other alkamin esters of para-toluic acid may be obtained.

What we claim as our invention is:—

1. As new products, the alkamin esters of para-toluic acid, being colorless compounds, oils or low-melting solids, readily soluble in alcohol, ether or benzene, very slightly soluble in water and of alkaline reaction toward litmus, forming salts readily soluble in water, decomposed when heated with acids or alkalis with formation of para-toluic acid and an alkamin, and whose solution in one equivalent weight of dilute acid produces local anesthesia.

2. As a new product, the alkamin ester, namely, the gamma-diethylamino propyl ester of para-toluic acid, being a colorless oil, readily soluble in alcohol, ether or benzene, very slightly soluble in water and of alkaline reaction toward litmus; decomposed when heated with hydrochloric acid or sodium hydroxid into para-toluic acid and gamma-diethylamino propyl alcohol, forming a salt with hydrochloric acid readily soluble in water and crystallizing from a mixture of acetone and ether in the form of snow-white crystals, the aqueous solution of which is of anesthetic action.

In testimony whereof we have hereunto affixed our signatures.

ERNEST A. WILDMAN.
LAMBERT THORP.